United States Patent [19]

Osterloh

[11] Patent Number: 4,552,374
[45] Date of Patent: Nov. 12, 1985

[54] PULLING HITCH ASSEMBLY

[76] Inventor: David Osterloh, 140 Osterloh Rd., Minster, Ohio 45865

[21] Appl. No.: 530,863

[22] Filed: Sep. 9, 1983

[51] Int. Cl.³ .................... B60D 1/14; A01B 73/00
[52] U.S. Cl. .............................. 280/411 R; 280/463; 172/313; 172/625
[58] Field of Search ............... 280/411 R, 411 C, 409, 280/656, 462, 463; 172/313, 314, 248, 625, 278, 286, 428; 403/43, 44, 45

[56] References Cited

U.S. PATENT DOCUMENTS

| | | | |
|---|---|---|---|
| 310,767 | 1/1885 | Wilson | 403/44 X |
| 2,203,981 | 6/1940 | Coultas | 280/411 C X |
| 2,971,774 | 2/1961 | Bartel | 172/248 X |
| 3,522,849 | 8/1970 | Sweet | 172/314 |
| 3,830,312 | 8/1974 | Brandly | 172/286 X |
| 4,044,906 | 8/1977 | Schrag et al. | 280/463 X |
| 4,232,876 | 11/1980 | Burres | 280/411 C X |
| 4,346,909 | 8/1982 | Hundeby | 280/411 C |
| 4,415,174 | 11/1983 | Koehn | 172/314 X |

FOREIGN PATENT DOCUMENTS 508986 2/1952 Belgium .................... 172/313

Primary Examiner—Joseph F. Peters, Jr.
Assistant Examiner—Charles R. Watts
Attorney, Agent, or Firm—Becker & Becker, Inc.

[57] ABSTRACT

A pulling hitch assembly, which includes a front beam which can be attached to a pulling unit, such as a tractor. An angle beam is pivotably attached to the front beam, and a pivoting device is provided which is associated with the front beam and the angle beam for effecting pivoting of the angle beam and the front beam relative to one another. Pivotably connected to the angle beam is a guide wheel assembly which includes a tire mounted on a wheel. Also provided is a fixed length cable which is connected to the front beam, is guided by the angle beam, and is connected to the guide wheel asssembly. The cable is disposed in such a way, and is of such a length, that it is adapted to pivot the guide wheel assembly relative to the angle beam, when the latter is pivoted relative to the front beam, in such a way that the tire of the guide wheel assembly is always disposed substantially perpendicular to the front beam.

13 Claims, 6 Drawing Figures

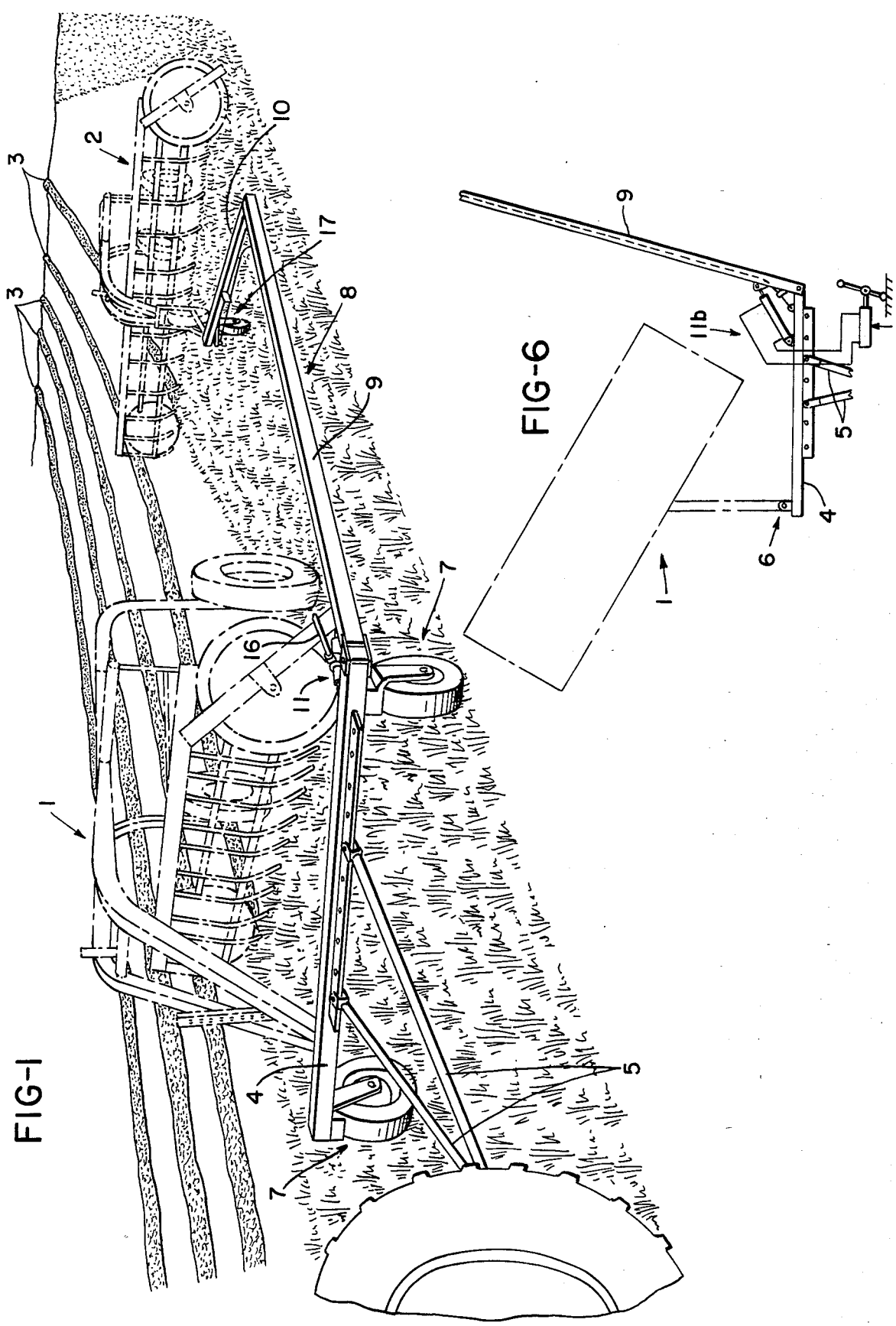

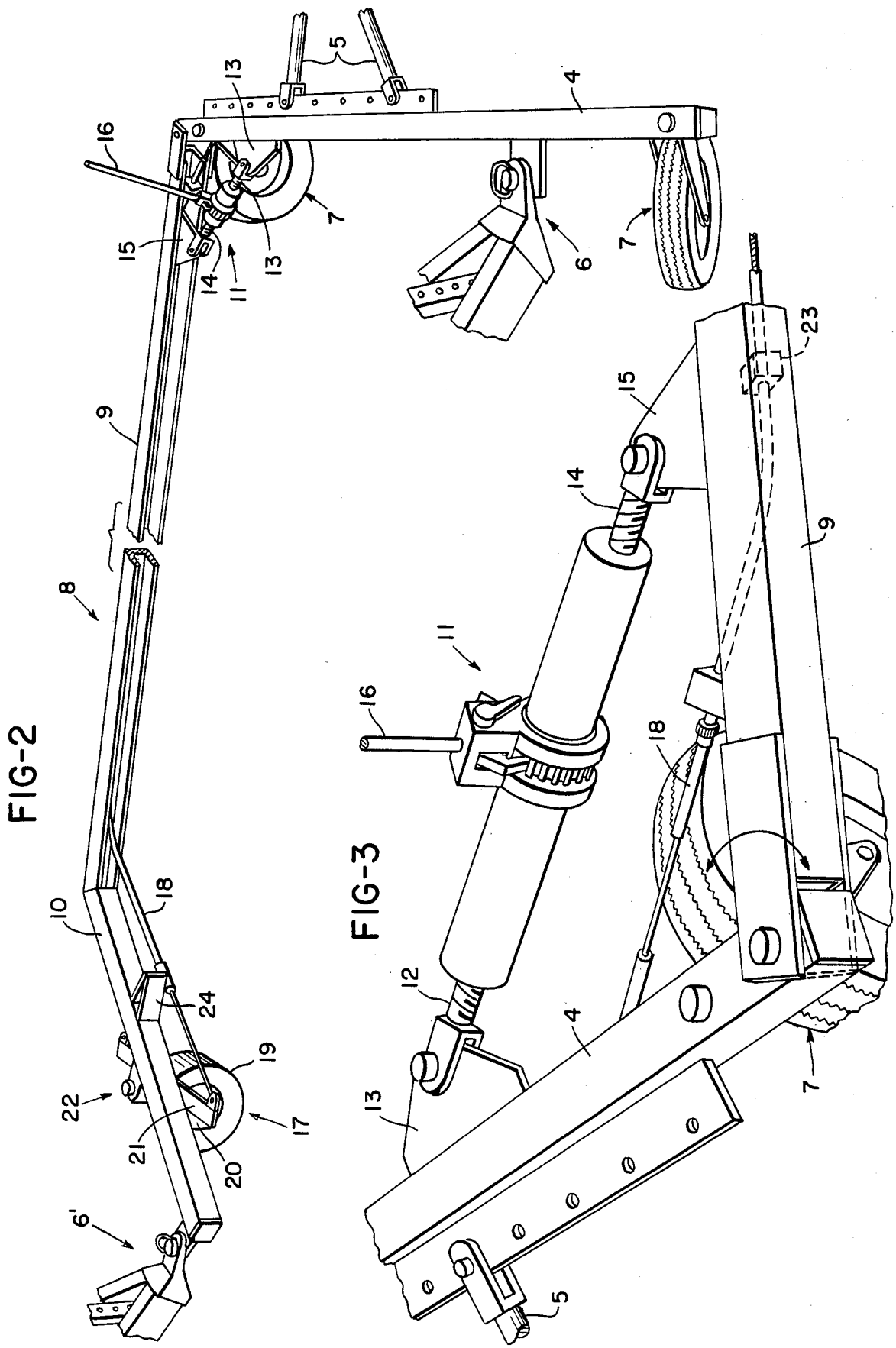

PULLING HITCH ASSEMBLY

BACKGROUND OF THE INVENTION

1. Field of the Invention

The present invention relates to a pulling hitch assembly, especially for pulling agricultural implements with a tractor.

2. Description of the Prior Art

It is often desirable to be able to pull two, for example agricultural, implements, such as two hayrakes, at the same time. These implements are generally arranged so as to be disposed one after the other, yet staggered when viewed in the direction of travel. The heretofore known hitch assemblies for pulling such implements either provide a rigid arrangement to which the implements are attached, or a somewhat pivotable arrangement which must be at least partially disassembled and reassembled each time the position of the implements relative to one another or to the direction of travel is to be altered. This is, of course, time consuming. Furthermore, the heretofore known hitch assemblies do not provide adequate steering or guiding.

It is therefore an object of the present invention to provide an improved pulling hitch assembly which overcomes the drawbacks of the heretofore known hitch assemblies. In particular, it is an object of the present invention to provide a pulling hitch assembly which is equipped with guide means to keep it properly directed, and which nonetheless is easy to adjust and to transport.

BRIEF DESCRIPTION OF THE DRAWINGS

These objects, and other objects and advantages of the present invention, will appear more clearly from the following specification in conjunction with the accompanying drawings, in which:

FIG. 1 is a schematic perspective view of one embodiment of the inventive pulling hitch assembly being used to pull two hayrakes;

FIG. 2 is a view of the pulling hitch assembly of FIG. 1 as seen from the opposite side, FIG. 3 is a detailed enlarged view of the pivotal connection of the side beam to the front beam, and of the means for effecting pivoting thereof;

FIG. 6 shows a hydraulic arrangement in place of the ratchet arrangement for pivoting the side beam relative to the front beam.

SUMMARY OF THE INVENTION

Figure 4:
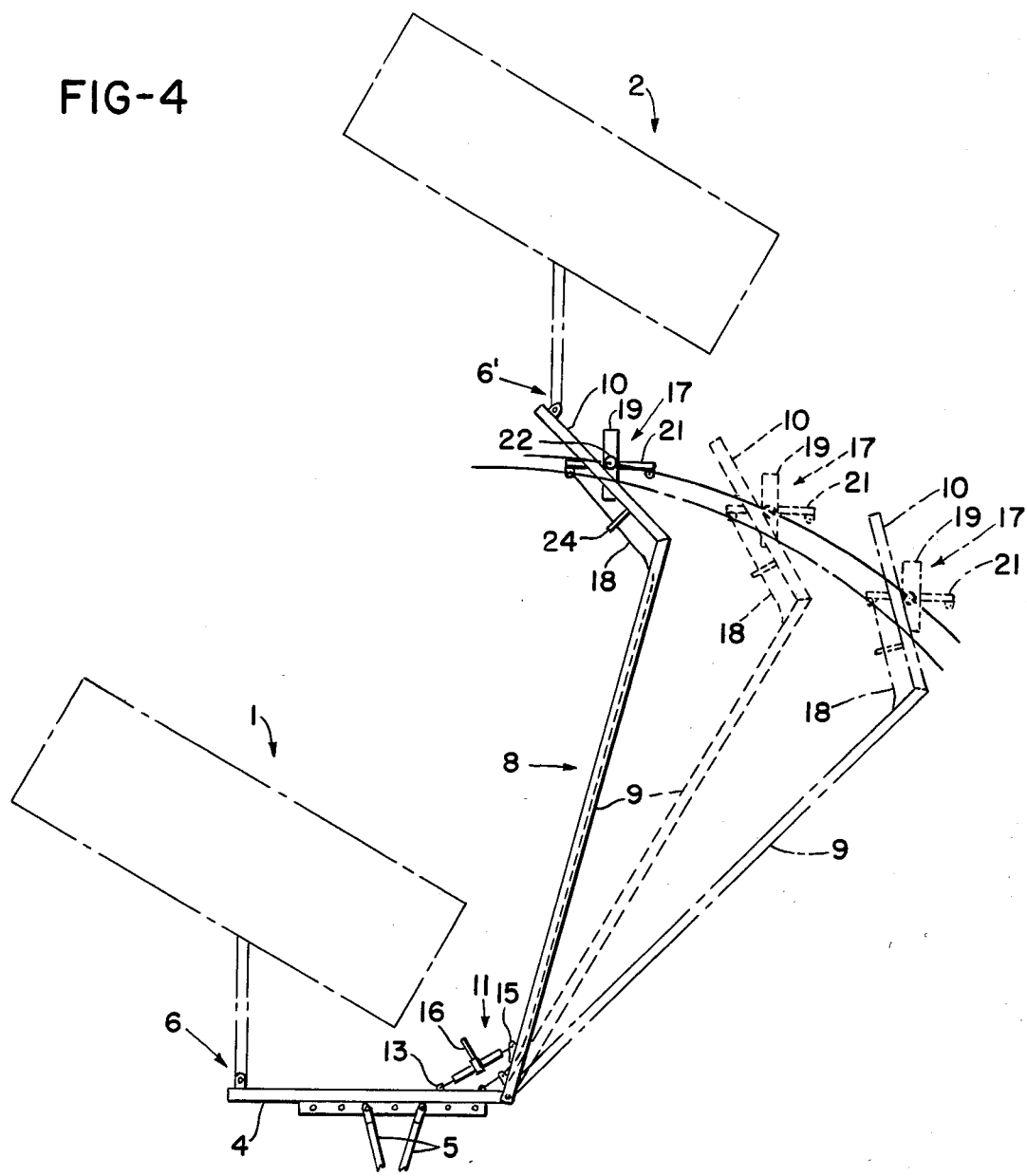
FIG. 4 is a diagrammatic illustration of the perpendicular orientation of the rear guide wheel assembly throughout the arc of travel of the side beam as it is pivoted relative to the front beam.

The pulling hitch assembly of the present invention is characterized primarily by a front beam which is adapted to be attached to a pulling unit, such as a tractor; by an angle beam which is pivotally attached to the front beam; by pivoting means which is associated with the front beam and the angle beam for effecting pivoting of the angle beam relative to the front beam; by a guide wheel assembly which includes a tire mounted on a wheel, and which is pivotably connected to the angle beam; and by a fixed length cable which is connected to the front beam, is guided by the angle beam, and is connected to the guide wheel assembly; the cable is disposed in such a way, and is of such a length, that it is adapted to pivot the guide wheel assembly relative to the angle beam, when the latter is pivoted relative to the front beam, in such a way that the tire of the guide wheel assembly is always disposed substantially perpendicular to the front beam.

Pursuant to specific advantageous embodiments of the inventive pulling hitch assembly, the angle beam may include a side beam which is pivotably attached to the front beam, and a rear beam which is remote from the front beam, is rigidly connected to the side beam, and to which the guide wheel assembly is pivotably connected; the pivoting means may be connected to the side beam and to the front beam for different pivoting threof relative to one another. The front beam and the rear beam may extend from the same side of the side beam.

The front beam may be a box beam which is provided with a first hook-up for an implement, and at least one connecting rod for attachment to a pulling unit. The side beam may be a channel beam in which the cable is guided. The rear beam also may be a box beam which is provided with a second hook-up for another implement. The side beam may be provided with guide means which are disposed in the channel thereof for effecting guiding of the cable therein. The rear beam may be provided with a support bracket for fixing the position of the cable relative to the rear beam. This cable may be a sheathed cable.

The guide wheel assembly may include an adjusting bar which is rigidly connected to the wheel thereof, and is pivotably connected to the rear beam. The cable may be connected to this adjusting bar to effect pivoting of the guide wheel assembly relative to the rear beam when the side beam is pivoted relative to the front beam.

At least one dolly wheel assembly may be provided, and is connected to the front beam in such a way as to be freely pivotable relative thereto. The front beam may have two ends, and the pulling hitch assembly may be provided with two dolly wheel assemblies, one being pivotably connected in the vicinity of each of the ends of the front beam.

The pivoting means may be a ratchet arrangement for selectively drawing the side beam and the front beam toward one another, or for pushing the side beam and the front beam away from one another. Alternatively, the pivoting means may be a hydraulic arrangement for selectively pivoting the front beam and the side beam toward or away from one another.

Pursuant to one modification of the inventive pulling hitch assembly, the side beam may be provided with guide means which project therefrom and serve to guide the cable externally of the side beam. In this case, the cable may be a rod which is connected to the front beam and to the guide wheel assembly.

The advantage of the pulling hitch assembly of the present invention is that said assembly is equipped with means for adjusting, as desired or needed, the position of implements attached thereto, while simultaneously assuring that the guide wheel assembly for the hitch assembly is always properly oriented, namely substantially perpendicular to the front beam, so that the hitch assembly will travel in the desired direction. Due to the disposition of the cable, this can be accomplished merely by the means which are provided for pivoting the angle beam, since pivoting the latter relative to the front beam results in pivoting of the guide wheel assembly relative to the angle beam in such a way that the guide wheel assembly is always disposed substantially perpendicular to the front beam. The implement are detachbly connected to the inventive pulling hitch assembly, and the latter can be transported in the adjusted position or, if the angle beam is pivoted out further than desired, it is merely necessary to activate the pivoting means to pivot the angle beam back in towards the front beam; no uncoupling or disassembly of any of the parts of the inventive pulling hitch assembly is required once the implements are attached thereto.

DESCRIPTION OF PREFERRED EMBODIMENTS

Referring now to the drawings in detail, FIG. 1 shows the inventive pulling hitch assembly being used to pull two hay rakes 1 and 2. Due to the inventive construction of the pulling hitch assembly, the hay rakes 1 and 2 are always kept in true constant alignment relative to one another and to the direction of travel. As a result, while minimizing overlap of the ground covered by the rakes 1 and 2 during a given pass, evenly spaced rows 3 of raked hay are produced, which can then be efficiently picked up by other equipment.

The pulling hitch assembly of the present invention is shown in greater detail in FIGS. 2 and 3. In particular, the pulling hitch assembly includes a front beam 4, which in the illustrated embodiment is in the form of a box beam. Two connecting rods 5, the position of attachment of which on the front beam 4 can be varied, provide the means for attaching the front beam 4, and hence the pulling hitch assembly, to a tractor or other motorized or even animal-drawn pulling unit.

The front implement, in this case the hay rake 1, is detachably connected to the front beam 4 at the hook-up 6. Pivotably attached to the front beam 4 are two freely pivotable dolly wheel assemblies 7, one of which is provided near each end of the front beam 4. Due to their freely pivotable nature, these dolly wheel assemblies 7 provide no steering or guiding capability for the pulling hitch assembly, but rather severe merely a load-bearing function.

Pivotably connected to the front beam 4 is an angle beam 8, which in the illustrated embodiment comprises a side channel beam 9 which is pivotably connected to the front beam 4, and a rear box beam 10 which is rigidly attached to the side beam 9 at an angle thereto. This angle can be any convenient angle, especially between 90°-180°; i.e., the rear beam 10 can be at right angles to the side beam 9, can be in-line therewith, or can be any angle therebetween or even greater than or less than this range. The rear implement, in this case the hay rake 2, is detachably connected to the rear beam 10 at the hook-up 6', which in the illustrated embodiment is shown as being located at that end of the rear beam 10 which is remote from its connection to the side beam 9. The hook-up 6' could, of course, be located elsewhere along the length of the rear beam 10. Pivoting means 11 for effecting movement of the side beam 9 and hence the angle beam 8 relative to the front beam 4 is connected both to the side beam 9 and to the front beam 4. This allows the distance between the implements 1 and 2 to the adjusted as needed. In FIGS. 2 and 3, this pivoting means 11 is shown as a ratchet arrangement. In particular, a left-hand threaded spindle 12 is rigidly attached to a flange 13 of the front beam 4, and a right-hand threaded spindle 14 is rigidly attached to a flange 15 of the side beam 9. Depending upon the direction of rotation of the crank lever 16, the threaded spindles 12 and 14 are either drawn toward one another, or are moved away from one another. Consequently, the side beam 9 is either pivoted toward or away from the front beam 4, either decreasing or increasing the angle therebetween.

In place of the ratchet arrangement 11, it is also possible to use manual or remote-controlled hydralic pivoting means, such as the pivoting means 11b illustrated in FIG. 6. Such hydraulic pivoting means could, for example, be operated directly from a tractor.

In order to provide steering or guiding for the pulling hitch assembly of the present invention, a rear guide wheel assembly 17 is pivotably connected to the rear beam 10. However, in contrast to the dolly wheel assemblies 7, the rear guide wheel assembly 17 is not freely pivotable. Instead, the rear guide wheel assembly 17 is fixed in position by means of the sheathed cable 18. In particular, the rear guide wheel assembly 17 comprises a tire 19 mounted on a wheel 20 which is rigidly attached to an adjusting bar 21. One part of this adjusting bar 21 is pivotably connected to the rear beam 10 at 22, while one end of the cable 18 is fixed to another part of the adjusting bar 21. The other end of the cable 18 is fixed to the front beam 4 in the vicinity of the pivoting means 11. The cable 18 is guided along the side beam 9 via guide means 23 (FIG. 3), and is supported on the rear beam 10 by means of a cable support bracket 24. Since the cable 18 is fixed on the front beam 4 and on the adjusting bar 21, and is fixed relative to the side beam 9 and the rear beam 10, when the side beam 9 is pivoted relative to the front beam 4 by means of the pivoting means 11, the position of the adjusting bar 21 is altered, thus moving the wheel 20 and the tire 19 which is mounted thereon. The length of the cable 18, and its point of attachment on the front beam 4, is selected such that the tire 19 of the rear guide wheel assembly 17 is always disposed substantially perpendicular to the front beam 4, i.e., is parallel to the direction of travel, regardless of the angular setting of the side beam 9 relative to the front beam 4.

The operation of the inventive pulling hitch assembly now will be described in further detail, with particular reference being made to FIG. 4. For purposes of discussion, the solid line will be assumed to be the starting position, in which the side beam 9 is disposed at 105° to the front beam 4. As can be clearly seen, the rear guide wheel assembly is disposed perpendicular to the front beam 4. Shown in dash lines is a second position, in which the side beam 9 is disposed at 120° to the front beam 4. Shown in dot-dash lines is a third position, in which the side beam 9 is disposed at 135° to the front beam 4. As can be clearly seen in FIG. 4, also in the second and third positions is the rear guide wheel assembly 17 perpendicular to the front beam 4. The arcs along which the pivot point 22 of the rear guide wheel assembly 17 and the point of attachment of the cable 18 to the adjusting bar 21 travel are shown by dot-dash lines. The angle of the side beam 9 to the front beam 4 can be varied over a considerable range, with the amount of pivot being limited only by the length of the threaded spindles 12 and 14. However, regardless of the angular setting of the side beam 9 relative to the front beam 4, the rear guide wheel assembly 17 will always be disposed perpendicular to the front beam 4. In particular, as the side beam 9 is pivoted away from the front beam 4 via the action of the pivoting means 11 and 11a, the constant length cable 18, due to its fixed connection to the front beam 4 and to the rear guide wheel assembly 17, and due to its fixed guiding in the side beam 9 and on the rear beam 10 by means of the guide means 23 and the cable support bracket 24, in effect pulls on the end of the adjusting bar 21, thus pivoting the rear guide wheel assembly 17 counterclockwise about the pivot point 22 and relative to the rear beam 10 to maintain the aforementioned perpendicular orientation of the rear guide wheel assembly 17 relative to the front beam 4. Similarly, if the side beam 9 is pivoted toward the front beam 4, the constant length cable 18 in effect pushes on the end of the adjusting bar 21, thus pivoting the rear guide wheel assembly 17 clockwise about the pivot point 22 and relative to the rear beam 10 to likewise maintain the perpendicular orientation of the rear guide wheel assembly 17 relative to the front beam 4.

Figure 5:
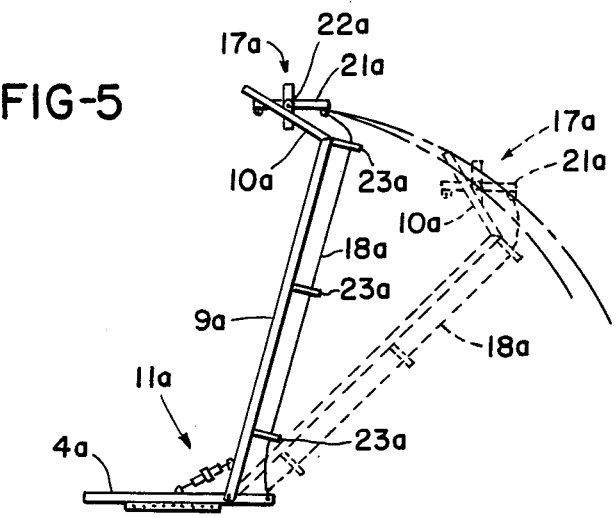
FIG. 5 shows a modification of the arrangement of the cable which effects pivoting of the rear guide wheel assembly.

FIG. 5 shows a modification of the arrangement of the sheathed cable 18 of FIGS. 1–4. In this embodiment, rather than being guided within the channel of the side beam 9, where of course it is more protected, the cable 18a, which in this case also could be a more rigid cable or even a bent rod, is guided via guide means 23a along the outside of the side beam 9a, and is attached to the adjusting bar 21a at a point remote from the point of attachment of the sheathed cable 18 of the adjusting bar 21. The other end of the cable 18a is attached near that end of the front beam 4a to which the side beam 9a is pivotably connected, with the pivot point of the side beam 9a relative to the front beam 4a being disposed somewhat inwardly from the end of the front beam 4a. The action of the cable 18a in effecting pivoting of the rear guide wheel assembly 17a relative to the rear beam 10a, for maintaining the perpendicular orientation of the rear guide wheel assembly 17a relative to the front beam 4a, is the reverse of the action of the sheathed cable 18 in effecting pivoting of the rear guide wheel assembly 17. In particular, as the side beam 9a is pivoted away from the front beam 4a via the action of the pivoting means 11a, the constant length cable 18a, again due to its fixed connection to the front beam 4a and the rear guide wheel assembly 17a and its fixed guiding in the guide means 23a, with this embodiment in effect pushes on the end of the adjusting bar 21a, thus pivoting the rear guide wheel assembly 17a counterclockwise about the pivot point 22a and relative to the rear beam 10a to maintain the perpendicular orientation of the rear guide wheel assembly 17a relative to the front beam 4a. When the side beam 9a is pivoted toward the front beam 4a, the constalt length cable 18a in effect pulls on the end of the adjusting bar 21a, thus pivoting the rear guide wheel assembly 17a clockwise about the pivot point 22a and relative to the rear beam 10a to likewise maintain the perpendicular orientation of the rear guide wheel assembly 17a relative to the front beam 4a.

Although in the drawings hay rakes have been shown as the implements attached to the inventive pulling hitch assembly, and in particular to the front beam 4 and the rear beam 10, it also would be possible to attach a variety of other implements thereto.

The present invention is, of course, in no way restricted to the specific disclosure of the specification and drawings, but also encompasses any modifications within the scope of the appended claims.

What I claim is:

1. A pulling hitch assembly for pulling agricultural implements with a tractor or other motorized or even animal-drawn pulling unit, comprising:
    a front beam which is adapted to be attached to a pulling unit;
    an angle beam which is pivotally attached to said front beam;
    pivoting means associated with said front beam and said angle beam for effecting pivoting of said angle beam relative to said front beam;
    a guide wheel assembly which includes a tire mounted on a wheel, and which is pivotably connected to said angle beam in a location remote from said pivoting means; and
    a fixed length cable which is connected directly to said front beam, is guided by said angle beam, and is connected only to said guide wheel assembly; said cable being disposed in such a way, and being of such a length, that said cable is adapted to pivot said guide wheel assembly exclusively relative to said angle beam, when the latter is pivoted relative to said front beam, in such a way that said tire of said guide wheel assembly is pivotable independently of any tractor or pulling unit and is always disposed substantially perpendicular to said front beam irrespective of position and direction of any tractor or pulling unit therewith.

2. A pulling hitch assembly according to claim 1, in which said angle beam includes a side beam, which is pivotably attached to said front beam, and a rear beam, which is remote from said front beam, is rigidly connected to said side beam, and to which said guide wheel assembly is pivotably connected; said pivoting means is connected to said side beam and said front beam for effecting pivoting thereof relative to one another.

3. A pulling hitch assembly according to claim 2, in which said front beam and said rear beam extend from the same side of said side beam.

4. A pulling hitch assembly according to claim 2, in which said front beam is a box beam which is provided with a first hook-up for an implement, and at least one connecting rod for attachment to a pulling unit; in which said side beam is a channel beam in which said cable is guided; and in which said rear beam is a box beam which is provided with a second hook-up for another implement.

5. A pulling hitch assembly according to claim 4, in which said side beam is provided with guide means disposed in the channel thereof for effecting said guiding of said cable therein; and in which said rear beam is provided with a support bracket for fixing the position of said cable relative to said rear beam.

6. A pulling hitch assembly according to claim 5, in which said cable is a sheathed cable.

7. A pulling hitch assembly according to claim 2, in which said guide wheel assembly includes an adjusting bar which is rigidly connected to said wheel thereof, and is pivotably connected to said rear beam; and in which said cable is connected to said adjusting bar to effect pivoting of said guide wheel assembly relative to said rear beam when said beam is pivoted relative to said front beam.

8. A pulling hitch assembly according to claim 2, which includes at least one dolly wheel assembly which is connected to said front beam in such a way as to be freely pivotably relative thereto.

9. A pulling hitch assembly according to claim 8, in which said front beam has two ends; and which includes two dolly wheel assemblies, one pivotably connected in the vicinity of each of said ends of said front beam.

10. A pulling hitch assembly according to claim 2, in which said pivoting means is a rigid arrangement for selectively drawing said side beam and said front beam toward one another, and for moving same away from one another.

11. A pulling hitch assembly according to claim 2, in which said pivoting means is a hydraulic arrangement for selectively pivoting said side beam and said front beam toward and away from one another.

12. A pulling hitch assembly according to claim 2, in which said side beam is provided with guide means which project therefrom and serve to guide said cable therealong.

13. A pulling hitch assembly according to claim 12, in which said cable is a rod which is connected to said front beam and to said guide wheel assembly.

* * * * *